US006474021B2

(12) United States Patent
Homeyer

(10) Patent No.: US 6,474,021 B2
(45) Date of Patent: Nov. 5, 2002

(54) COLLAPSIBLE BARRIER

(76) Inventor: Shelley M. Homeyer, 2015 W. Main St., Houston, TX (US) 77098

( * ) Notice: Subject to any disclaimer, the term of this patent is extended or adjusted under 35 U.S.C. 154(b) by 46 days.

(21) Appl. No.: 09/780,242

(22) Filed: Feb. 9, 2001

(65) Prior Publication Data

US 2001/0011392 A1 Aug. 9, 2001

Related U.S. Application Data

(63) Continuation-in-part of application No. 09/524,226, filed on Mar. 13, 2000, now Pat. No. 6,185,762, which is a continuation of application No. 09/169,412, filed on Oct. 9, 1998, now Pat. No. 6,035,466.

(51) Int. Cl.[7] .......................... E06B 9/00; A47C 21/08; F16B 7/10

(52) U.S. Cl. .............................. 49/57; 160/372; 5/429; 5/425

(58) Field of Search ......................... 5/93.1, 98.1, 99.1, 5/922, 923, 424, 425, 428, 429; 160/372, 376, 377, 215; 49/57

(56) References Cited

U.S. PATENT DOCUMENTS

| | | | | | |
|---|---|---|---|---|---|
| 560,937 | A | * | 5/1896 | Ryan | 49/57 |
| 1,234,804 | A | * | 7/1917 | Reynolds | 5/429 |
| 2,357,819 | A | * | 9/1944 | Greer | 160/351 |
| 2,624,055 | A | * | 1/1953 | Rude | 5/429 |
| 2,851,746 | A | * | 9/1958 | McPhaden | 49/465 |
| 3,032,781 | A | * | 5/1962 | Constanti | 5/429 |
| 3,045,259 | A | * | 7/1962 | Mayer | 5/429 |
| 3,048,857 | A | * | 8/1962 | Hutt | 5/429 |
| 3,097,370 | A | * | 7/1963 | Murcott | 5/429 |
| 3,223,098 | A | * | 12/1965 | Dole, Jr. | 135/126 |
| 3,351,962 | A | * | 11/1967 | Dodrill et al. | 5/429 |
| 3,548,426 | A | * | 12/1970 | Helton | 5/429 |
| 3,624,847 | A | * | 12/1971 | Murcott et al. | 5/429 |
| 3,747,133 | A | * | 7/1973 | Hutt | 5/429 |
| 3,823,428 | A | * | 7/1974 | Whyte | 5/429 |
| 3,851,345 | A | * | 12/1974 | Benoit et al. | 5/429 |
| 3,855,654 | A | * | 12/1974 | Pivacek | 5/429 |
| 4,064,575 | A | * | 12/1977 | Sanders | 5/429 |
| 4,590,956 | A | * | 5/1986 | Griesenbeck | 135/116 |
| 4,671,012 | A | * | 6/1987 | Merklinger et al. | 49/57 X |
| 4,724,559 | A | * | 2/1988 | Bly et al. | 5/425 |
| 4,827,958 | A | * | 5/1989 | Cantwell et al. | 135/127 |
| 4,852,598 | A | * | 8/1989 | Griesenbeck | 135/137 |
| 5,038,430 | A | * | 8/1991 | Bly | 5/429 X |
| 5,339,567 | A | * | 8/1994 | Pierpont et al. | 49/57 X |
| 5,361,794 | A | * | 11/1994 | Brady | 135/147 |
| 5,423,341 | A | * | 6/1995 | Brady | 135/139 |
| 5,435,024 | A | * | 7/1995 | Capshaw | 5/417 |
| 5,531,258 | A | * | 7/1996 | Poulson et al. | 160/376 |
| 5,575,113 | A | * | 11/1996 | Huang | 160/372 X |
| 5,638,885 | A | * | 6/1997 | Freese et al. | 160/371 |
| 5,657,809 | A | * | 8/1997 | Longoria et al. | 160/377 X |
| 5,704,164 | A | * | 1/1998 | Huang | 160/372 X |
| 5,797,218 | A | * | 8/1998 | Holland | 49/57 X |
| 6,035,466 | A | * | 3/2000 | Homeyer | 5/99.1 |
| 6,056,038 | A | * | 5/2000 | Foster et al. | 160/372 X |
| 6,185,762 | B1 | * | 2/2001 | Homeyer | 5/99.1 |

FOREIGN PATENT DOCUMENTS

| | | | | |
|---|---|---|---|---|
| GB | 1539619 | * | 1/1979 | 5/425 |

* cited by examiner

*Primary Examiner*—Robert G. Santos
(74) *Attorney, Agent, or Firm*—Trop, Pruner & Hu, P.C.

(57) ABSTRACT

A collapsible barrier includes a collapsible frame and a flexible cover that is attached to the frame. The frame may include tubes connected by couplings and an elastic cord. When in use, the barrier may be used as a gate to prevent small children and animals from entering or exiting a room or other such space. When the tubes and couplings are disconnected, the gate folds so that it may be easily stored or transported.

20 Claims, 8 Drawing Sheets

COLLAPSIBLE BARRIER

This application a continuation-in-part of application Ser. No. 09/524,226 filed on Mar. 13, 2000 issuing as U.S. Pat. No. 6,185,762 on Feb. 13, 2001, which is a continuation of application number Ser. No. 09/169,412 filed on Oct. 9, 1998, which issued as U.S. Pat. No. 6,035,466 on Mar. 14, 2000.

BACKGROUND

This invention relates generally to barriers that are intended to protect infants, toddlers and pets by blocking their entry into potentially dangerous areas such as a staircase.

There are many dangers lurking inside a home for an infant or toddler to encounter, one of them being stairs. Thus, parents and other caretakers may be advised when "baby-proofing" their home to provide a barrier to prevent the child from gaining access to a staircase. Typically these barriers are in the form of a gate.

Many gates are intended to be permanently or semi-permanently fixed at the top and/or bottom of a staircase. Once installed, these types of gates are not easily removed and transported. Other types of gates may not be as permanently placed; however, these gates also tend to be cumbersome and difficult to transport. This creates a problem for parents who need to bring a gate with them when traveling with their small children.

For example, parents may visit family members or friends who do not have safety gates already in place. Thus, the parents might need to bring a gate with them. Because traveling with a small child usually requires transporting other equipment such as a stroller, car seat and playard, it is desirable to have a safety gate that is easy to transport, install and remove.

Thus, there is a need for a collapsible barrier that is easy to transport.

DETAILED DESCRIPTION

Figure 1:
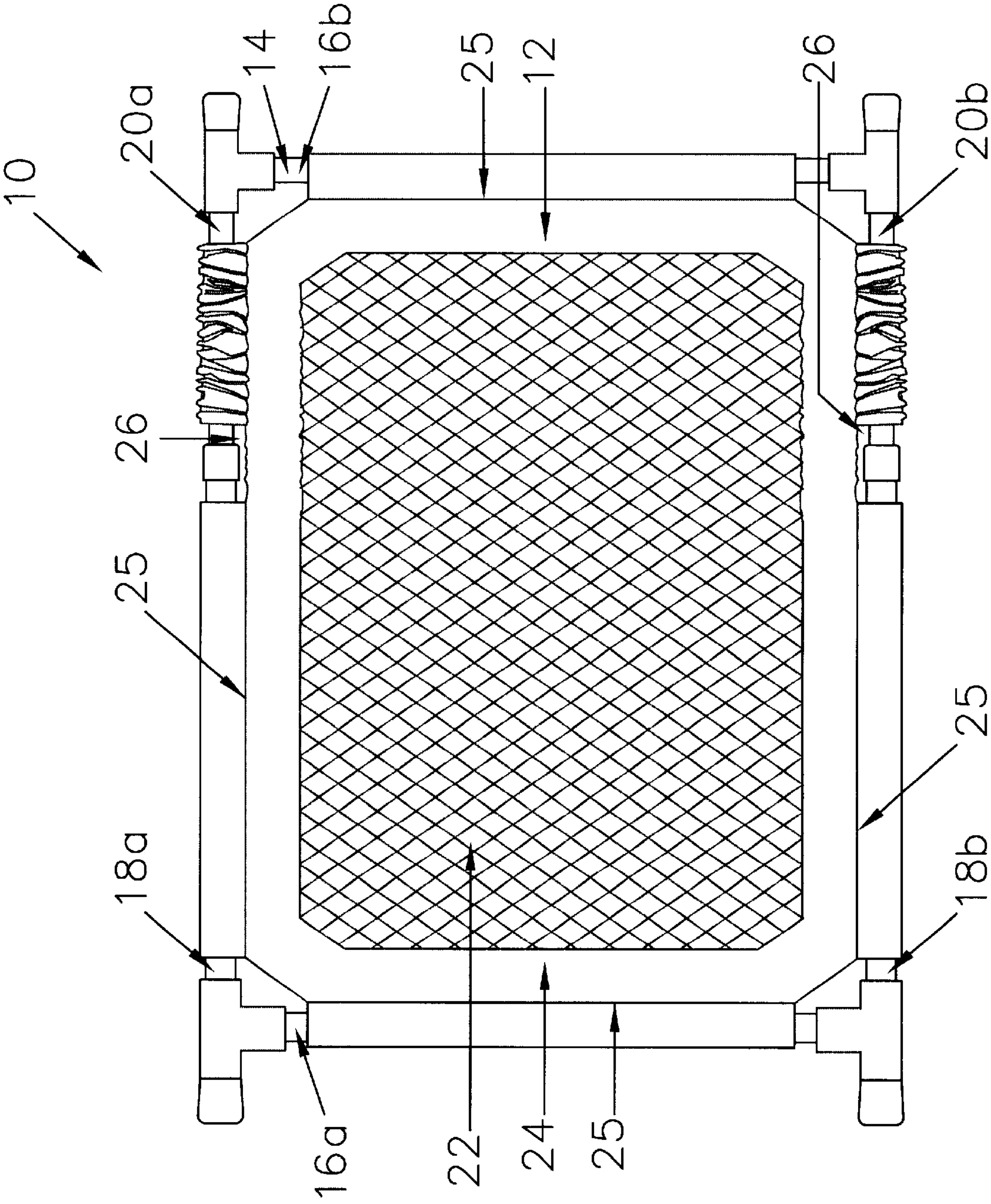
FIG. 1 is a front elevational view of one embodiment of the present invention.

Referring to the drawings wherein like reference characters are used for like parts throughout the several views, a collapsible barrier 10, shown in FIG. 1, acts as a partition to block stairs and other areas that may be dangerous for children or animals to be without close supervision. The barrier 10 includes a collapsible frame 14 and a flexible cover 12.

Figure 2:
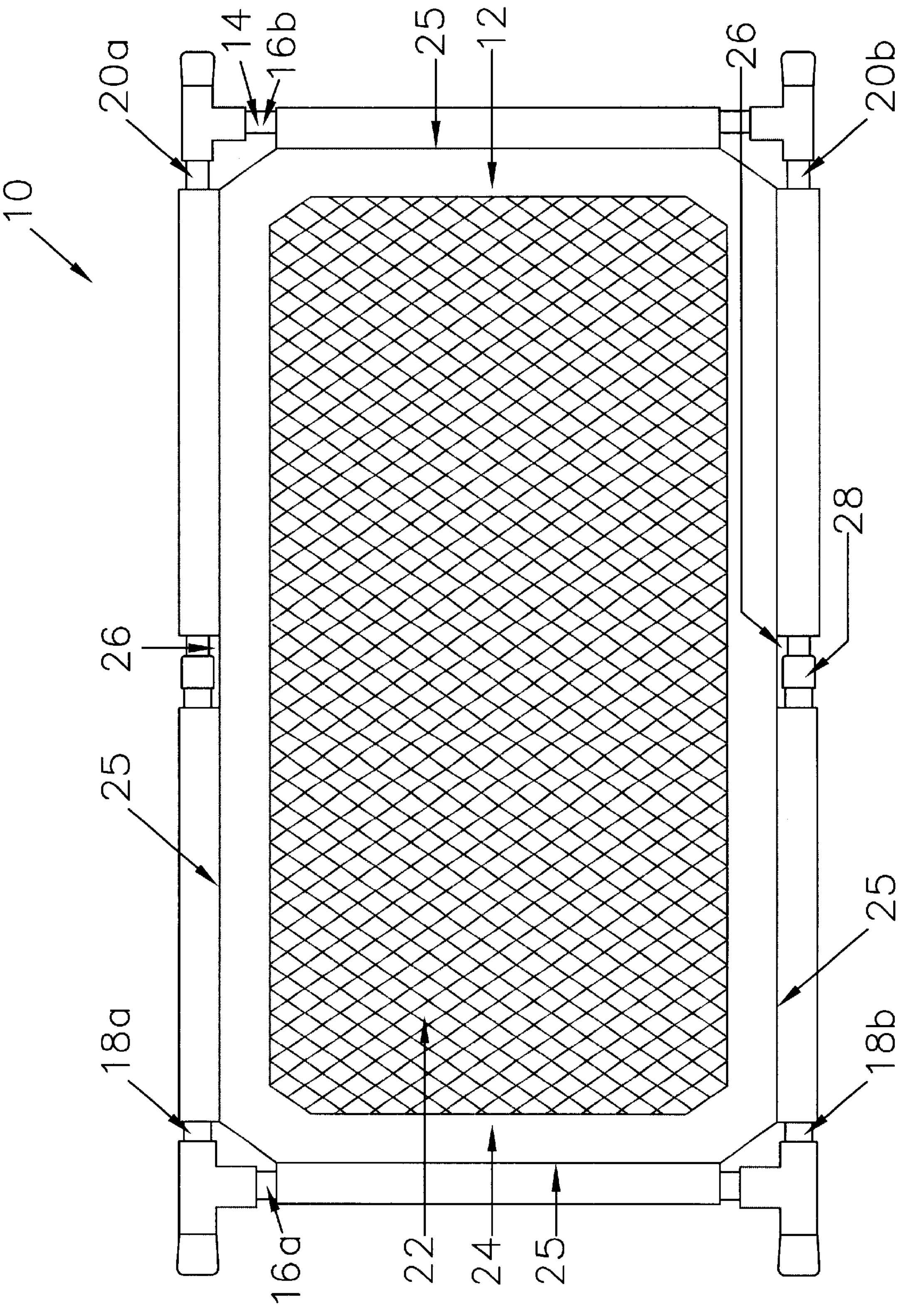
FIG. 2 is a front elevational view of the embodiment in FIG. 1 that is adjusted to fit a doorway of a different width than in FIG. 1.

In some embodiments, the cover 12 may envelop the frame 14. The cover 12 may have loose folds that unfold to cover the frame 14 at a greater width and refold to cover the frame 14 at a lesser width. For example, when the frame 14 is fully extended, as shown in FIG. 2, the cover 12 may be completely unfolded and taut. However, when the frame 14 is not fully extended, as in FIG. 1, the cover 12 may be slack, having gathers or loose folds.

Moreover, the cover 12 may have a central see-through portion 22 and a folded portion 24 in one embodiment. The see-through portion 22 may be a meshed fabric, netting or the like, whereas the folded portion 24 may be a durable fabric such as canvas, nylon or the like.

The folded portion 24 is configured so that it folds over the frame 14 to encircle tubes 16, 18 and 20. A seam 25 in the folded portion 24 causes the folded portion 24 to hold the tubes 16, 18 and 20 close. Additionally, the folded portion 24 is secured to the central portion 22. The folded portion 24 may be permanently secured to the central portion 22. However, in some embodiments the folded portion 24 may be removably secured to the central portion 22 so that the cover 12 may be removed for cleaning. Additionally, in some embodiments, the part of the folded portion 24 that encircle the tubes 18 and 20 may have cut outs 26 to allow the user to manipulate the frame 14.

As shown in FIG. 2, the barrier 10 is adjustable to accommodate doorways and stairways of various widths. Generally, the tubes 18 and 20 are engaged so that tube 20 telescopically moves inside tube 18 to make the barrier 10 more or less wide. A locking mechanism 28, such as a twist lock, may be used to secure the tubes 20 at a desired length and prevent the tubes 20 from moving. The locking mechanism 28 is of the type commonly found on extendable paintbrushes and on poles used for cleaning swimming pools.

Figure 3:
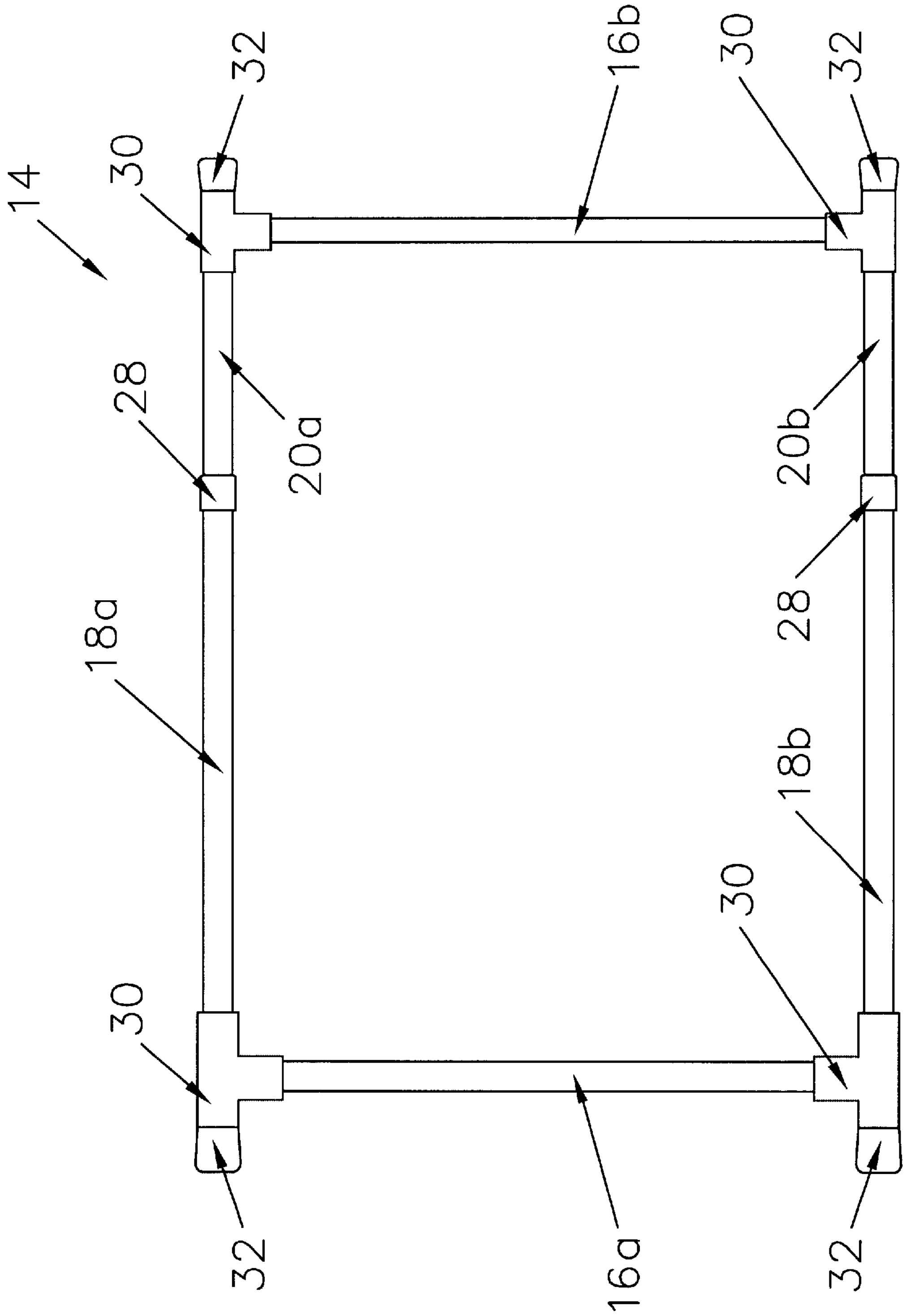
FIG. 3 is a front elevational view of the frame utilized in the embodiment shown in FIG. 1.

As shown in FIG. 3, in one embodiment, the frame 14 is formed from hollow tubes 16, 18 and 20. Couplings 30, such as hollow tubing-tees, may connect tube **16*a* to tubes 18*a* and 18*b*, and tube 16*b* to tubes 20*a* and 20*b*. Tubes 18 and 20 are engaged as previously described. When in use, tubes 16 are vertical and tubes 18 and 20** are horizontal.

The ends of tubes 16 may be removably telescoped within the interior of the couplings 30. Moreover one end of tubes 18 and one end of tubes 20 are also removably telescoped within the interior of the couplings 30. The connections between the couplings 30 and the tubes 16, 18 and 20 are all resilient so that the barrier 10 is substantially self-assembled.

The couplings 30 may also be connected to feet 32. The feet 32 apply pressure to a vertical surface, such as the walls of a doorway or stairway, to keep the barrier 10 in place. The feet 32 may be rubber or plastic tips or the like.

Figure 4:
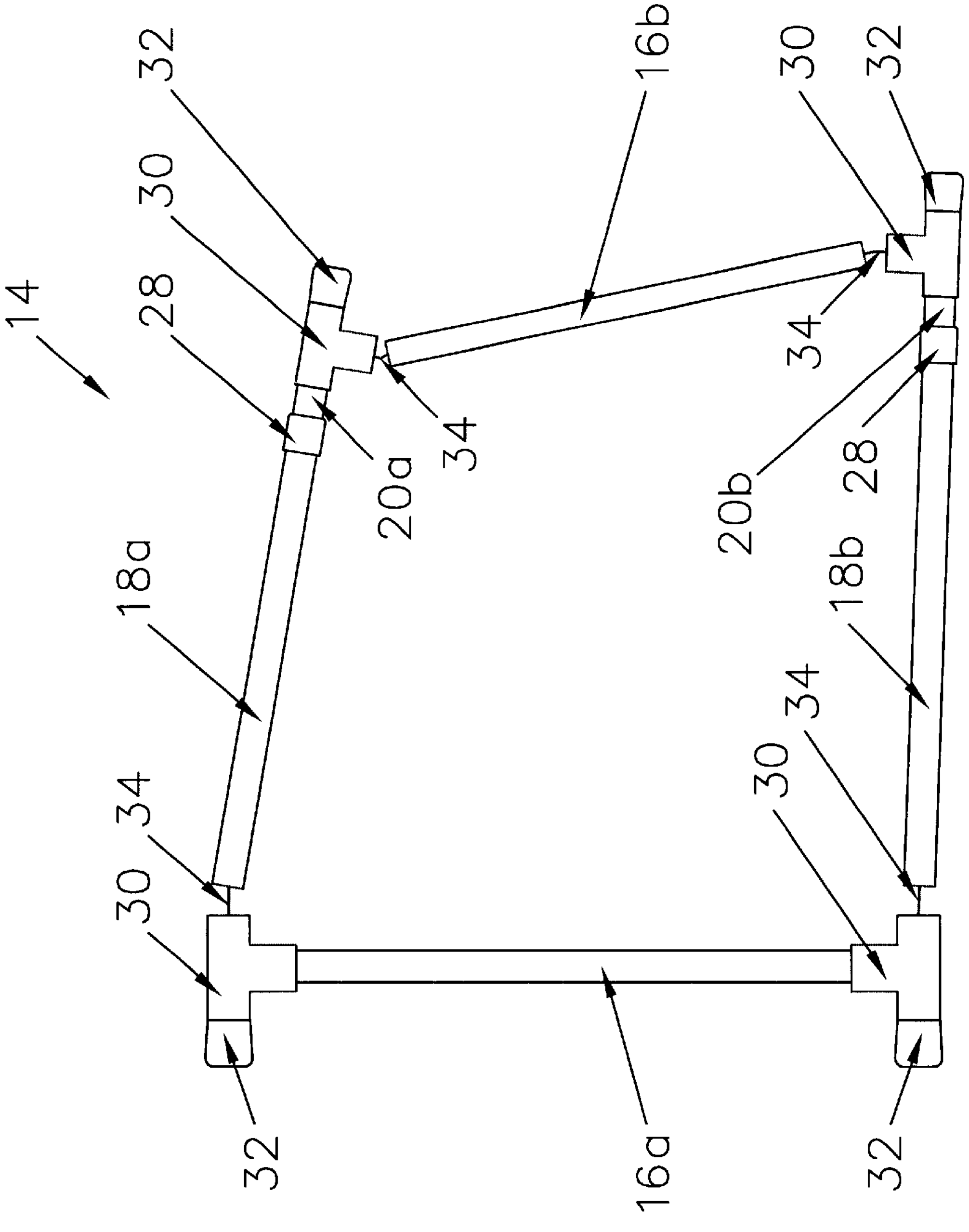
FIG. 4 is a front elevational view of the frame utilized in the embodiment shown in FIG. 1 that is partially disassembled.

Turning to FIG. 4, the frame 14 has been partially disassembled to show some resilient connections between the couplings 30 and the tubes 16 and 18. In this illustration, tubes **18*a* and 18*b* have been removed from the couplings 30. Moreover the tube 16*b* has been removed from the couplings 30. The tube 16*a* and the tubes 20*a* and 20*b* are removable from the couplings 30** in a like manner.

Figure 5:
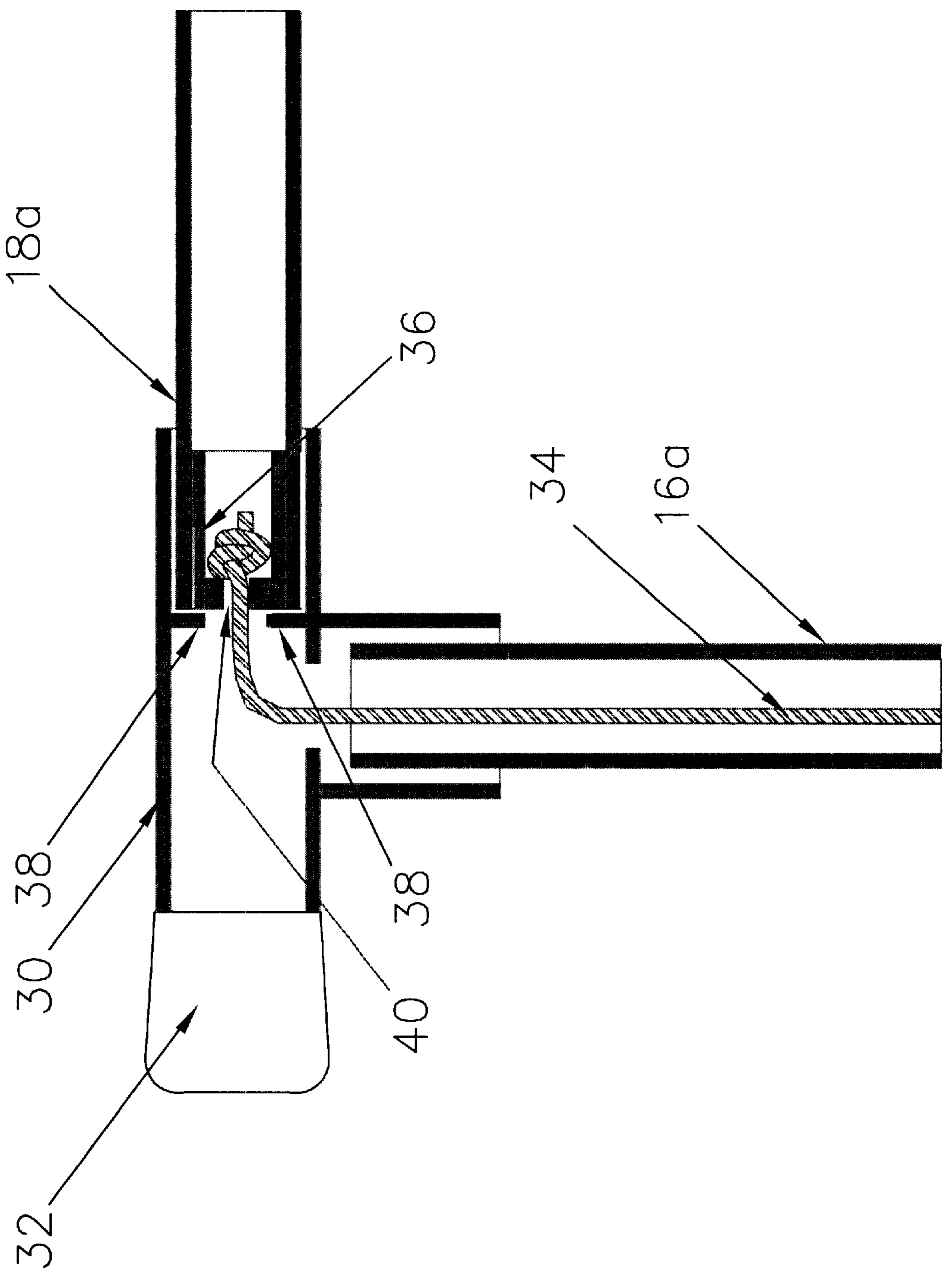
FIG. 5 is a cross-sectional view generally taken along the vertical plane of the upper left side of the frame in FIG. 3.

In this embodiment, elastic cords 34 extend through the tubes 16, 18 and 20 and the couplings 30. An elastic cord 34 may originate in tube **18*a*, as shown in FIG. 5. The cord 34 then may pass through a coupling 30 and tube 16*b*, also shown in FIG. 5. Lastly, the cord 34 may pass through another coupling 30 to terminate in the tube 18*b*** (not shown).

Another elastic cord 34 may mirror the first elastic cord 34. That is, another elastic cord 34 may originate in tube 20*a*, pass through a coupling 30, the tube 16*b*, another coupling 30 to terminate in tube 20*b* (not shown).

The elastic cords 34 are anchored within the tubes 18 and 20 by plugs 36. One such fixture is shown in FIG. 5, however, all four corners of the barrier 10 share a similar configuration. A plug 36 may be fitted inside the tube 18*a*, as shown in FIG. 5. The plug 36 may be permanently attached within the tube 18*a* by glue or the like so that the plug 36 will not come loose when the cord 34 is under tension. In this embodiment, the elastic cord 34 is knotted to prevent it from exiting an opening 40 in the plug 36. However, any other means may be used to keep the elastic cord 34 from pulling through the opening 40 of the plug 36.

Stops 38 within the coupling 30 prevent the tube 18*a* from being pulled through the coupling 30 by the elastic cord 34. Stops 38 may be rivets or the like.

Figure 6:
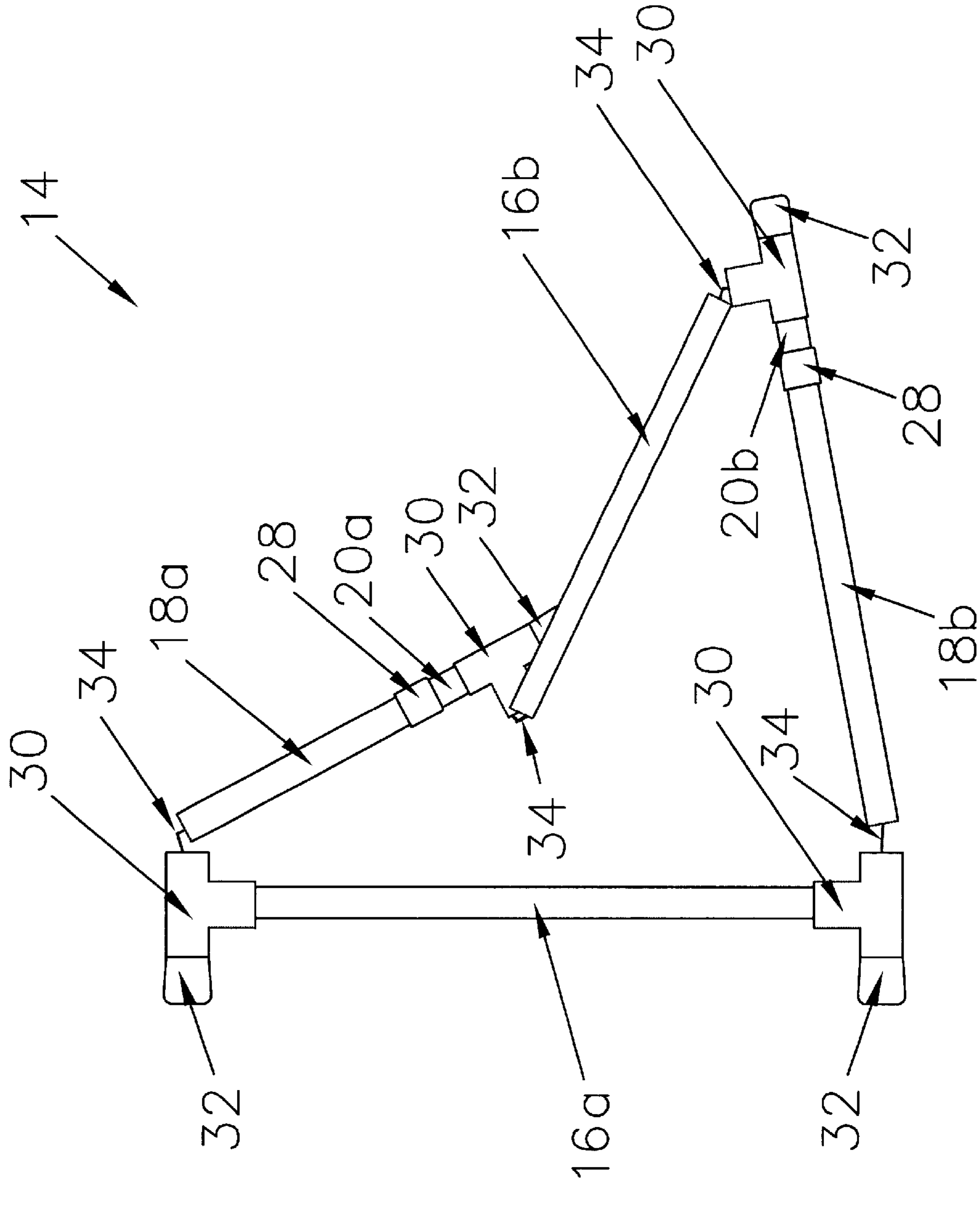
FIG. 6 is a front elevational view of the embodiment shown in FIG. 3 in a partially collapsed state.
Figure 7:
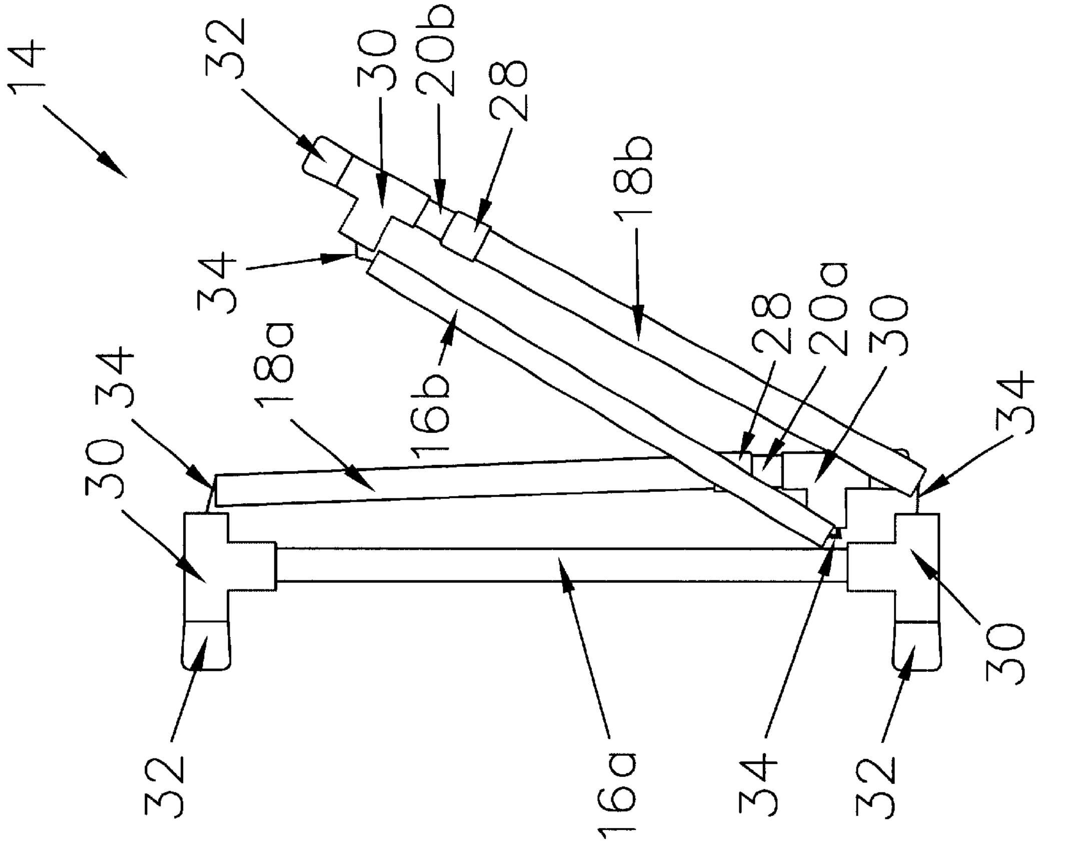
FIG. 7 is a front elevational view of the embodiment shown in FIG. 9 that has been collapsed further.
Figure 8:
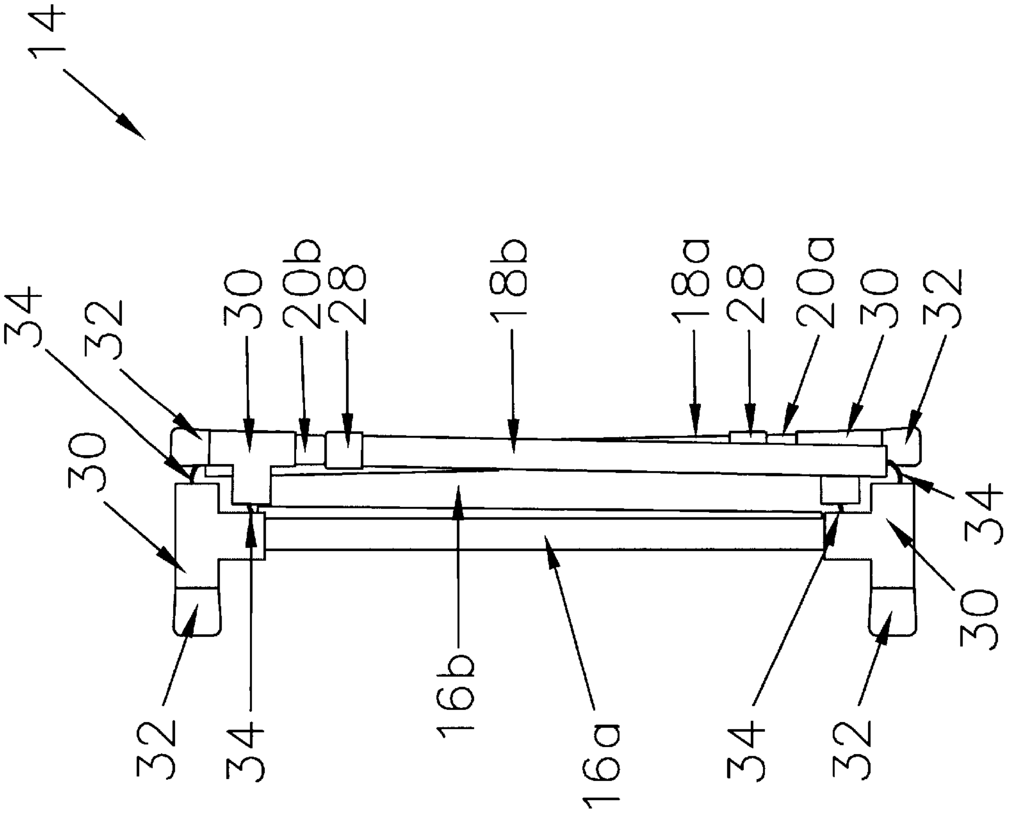
FIG. 8 is a front elevational view of the embodiment shown in FIG. 9 that is completely collapsed.

The frame 14 may transition between the relatively rigid state shown in FIG. 3 to a collapsed state shown in FIGS. 6 through 8. The transition between the relatively rigid state and the collapsed state is aided by the elastic cords 34. Generally, disconnecting a coupling 30 and a tube 16, 18 or 20 initiates the transition between the relatively rigid state and the collapsed state. As shown in FIGS. 6 and 7 as the gate collapses the remaining tubes 16, 18 and 20 may disconnect from the couplings 30 so that the frame 14, hence the barrier 10, folds up upon itself. Ultimately, the frame 14 completely collapses as shown in FIG. 8 so that the barrier 10 may be easily stored and/or transported.

When ready for use, the steps above may be reversed to achieve the relatively rigid state shown in FIG. 3. That is, by giving the barrier 10 a little shake, the tubes 16, 18 and 20, assisted by the cords 34, will removably insert into the couplings 30. As a result, the barrier 10 is quickly assembled and may be adjusted to fit into a particular opening such as a doorway or stairway.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A collapsible barrier comprising:

a collapsible frame including at least two resiliently coupled relatively rigid tubes, said tubes coupled by a relatively resilient connector such that said tubes may be selectively relatively rigidly coupled to one another and selectively relatively resiliently coupled to one another through said resilient connector when the relatively rigid coupling between said tubes is released, the first of said resiliently coupled tubes being engaged with a third relatively rigid tube such that said third tube moves telescopically within the first tube, said frame defining a rectangular partition when said two resiliently coupled tubes are relatively rigidly coupled; and a flexible cover adapted to cover said frame.

2. The barrier of claim 1 wherein said cover has a central see-through portion and a folded portion adapted to encircle the frame.

3. The barrier of claim 1 wherein said two resiliently coupled tubes are coupled through a tee shaped connector to telescopically receive said tubes such that the first tube forms a horizontal portion of said rectangle and the second of said tubes forms a vertical portion of said rectangle.

4. The barrier of claim 3 wherein said frame is adjustable for width by telescopically moving said third tube within said first tube.

5. The barrier of claim 4 including a locking mechanism adapted to prevent said third tube from telescopically moving.

6. The barrier of claim 5 wherein said locking mechanism is a twist lock.

7. The barrier of claim 3 including a foot coupled to said tee shaped connector.

8. The barrier of claim 5 including a fourth relatively rigid tube resiliently coupled to the second of said resiliently coupled tubes through a second relatively resilient connector such that said second tube and said fourth tube form a second selective relatively rigid coupling to one another and a second selective relatively resilient coupling to one another through said second connector when said second relatively rigid coupling is released, said fourth tube being engaged with a fifth relatively rigid tube such that said fifth tube moves telescopically within said fourth tube, said frame defining a rectangular partition when said second tube and said fourth tube are relatively rigidly coupled.

9. The barrier of claim 8 including a locking mechanism adapted to prevent said fifth tube from moving telescopically within said fourth tube.

10. The barrier of claim 9 including a sixth relatively rigid tube resiliently coupled by a third and a fourth relatively resilient connector with said third tube and said fifth tube respectively, such that said third tube and said sixth tube may be selectively relatively rigidly coupled to one another and selectively relatively resiliently coupled to one another through said third connector when the relatively rigid coupling between said third tube and the sixth tube is released, and said fifth tube and said sixth tube may be selectively relatively rigidly coupled to one another and selectively relatively resiliently coupled to one another through said fourth connector when the relatively rigid coupling between said fifth tube and said sixth tube is released, said frame defining a rectangular partition when said third tube and said sixth tube and said fifth tube and said sixth tube are rigidly coupled.

11. The barrier of claim 10 wherein said second, said third and said fourth connectors are tee shaped such that said second connector telescopically receive s said second tube and said fourth tube, said third connector telescopically receives said third tube and said sixth tube, and said fourth connector telescopically receives said fifth tube and said sixth tube, and said second, said third and said fourth connectors also being coupled to feet.

12. A method comprising:

resiliently coupling at least two relatively rigid tubes through a relatively resilient connector such that said tubes may be selectively relatively rigidly coupled to one another and selectively relatively resiliently coupled to one another through said resilient connector when the relatively rigid coupling between said tubes is released, engaging the first of said relatively rigid tubes with a third relatively rigid tube such that said third tube moves telescopically within the first tube, defining a rectangular frame when said two relatively rigid tubes are relatively rigidly coupled; and covering said rectangular frame with a flexible cover.

13. The method of claim 12 including coupling said two resiliently coupled tubes through a tee shaped connector that telescopically receives said tubes such that the first tube forms a horizontal portion of said rectangular frame and the second of said tubes forms a vertical portion of said rectangular frame.

14. The method of claim 13 including adjusting the width of the frame by telescopically moving said third tube within said first tube.

15. The method of claim 14 including locking said third tube with a locking mechanism adapted to prevent said third tube from telescopically moving.

16. The method of claim 13 including coupling a foot to said tee shaped connector.

17. The method of claim 16 including resiliently coupling a fourth relatively rigid tube to the second of said resiliently coupled tubes through a second relatively resilient connector such that said second tube and said fourth tube form a second selective relatively rigid coupling to one another and a second selective relatively resilient coupling to one another through said second connector when said second relatively rigid coupling is released, and engaging said fourth tube with a fifth relatively rigid tube such that said fifth tube moves telescopically within said fourth tube, and defining a rectangular frame when said second tube and said fourth tube are relatively rigidly coupled.

18. The method of claim 17 including locking the fifth tube with a locking mechanism to prevent said fifth tube from moving telescopically within said fourth tube.

19. The method of claim 18 including resiliently coupling a sixth relatively rigid tube through a third and a fourth relatively resilient connector with said third tube and said fifth tube respectively, such that said third tube and said sixth tube may be selectively relatively rigidly coupled to one another and selectively relatively resiliently coupled to one another through said third connector when the relatively rigid coupling between said third tube and the sixth tube is released, and said fifth tube and said sixth tube may be selectively relatively rigidly coupled to one another and selectively relatively resiliently coupled to one another through said fourth connector when the relatively rigid coupling between said fifth tube and said sixth tube is released, and defining a rectangular frame when said third tube and said sixth tube and said fifth tube and said sixth tube are rigidly coupled.

20. The method of claim 19 including telescopically receiving said second tube, said third tube, said fourth, said fifth tube and said sixth tube in tee shaped connectors such that said second connector telescopically receives said second tube and said fourth tube, said third connector telescopically receives said third tube and said sixth tube, and said fourth connector telescopically receives said fifth tube and said sixth tube, and coupling said second, said third and said fourth connectors to feet.

* * * * *